No. 614,033. Patented Nov. 8, 1898.
F. C. STETTLER.
VENTILATED FRUIT PACKING PACKAGE.
(Application filed Nov. 22, 1897.)
(No Model.)
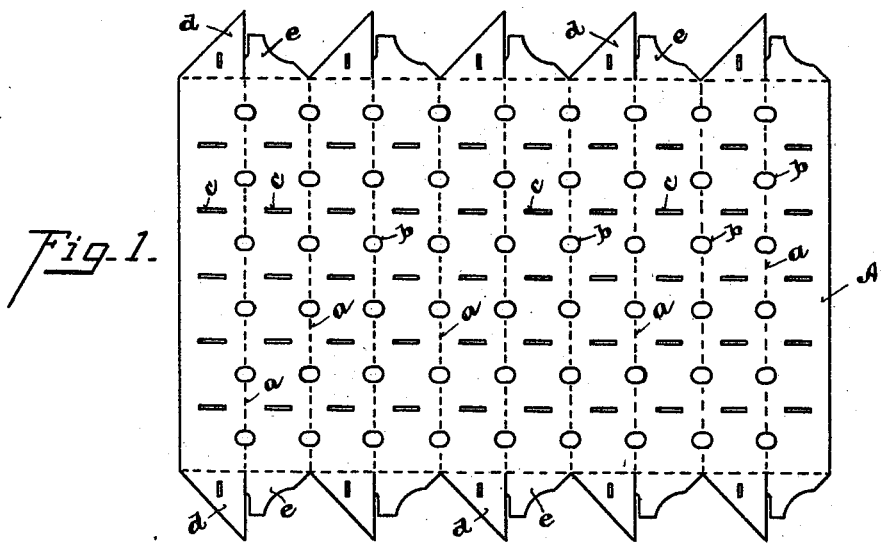
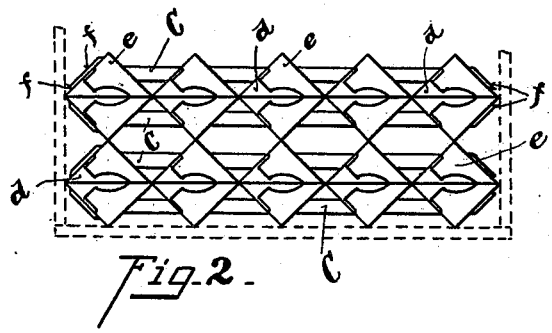
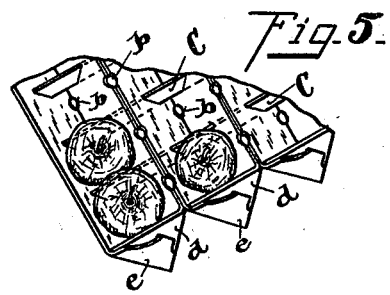
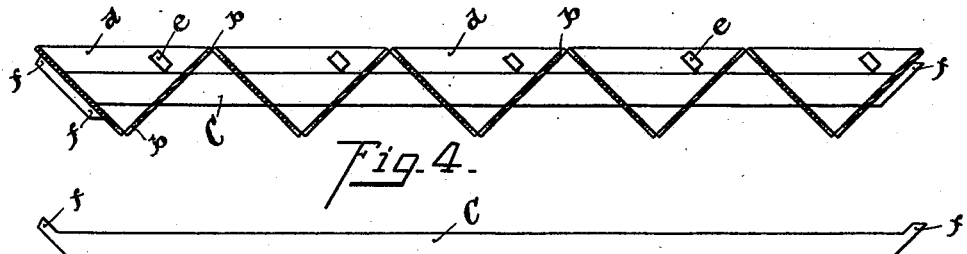
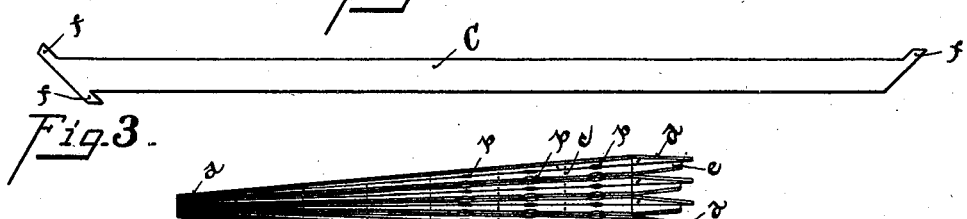
Witnesses
Oliver B. Kaiser
C. W. Miles
Inventor
Francis C. Stettler
by Wood & Boyd
Attorneys
THE NORRIS PETERS CO., PHOTO-LITHO., WASHINGTON, D. C.

UNITED STATES PATENT OFFICE.

FRANCIS C. STETTLER, OF DAYTON, OHIO.

VENTILATED FRUIT-PACKING PACKAGE.

SPECIFICATION forming part of Letters Patent No. 614,033, dated November 8, 1898.

Application filed November 22, 1897. Serial No. 659,499. (No model.)

*To all whom it may concern:*

Be it known that I, FRANCIS C. STETTLER, residing at Dayton, in the county of Montgomery and State of Ohio, have invented certain new and useful Improvements in Ventilated Fruit-Packing Packages, of which the following is a specification.

The object of my invention is to provide a package in which fruit can be nested and shipped. It is especially adapted to ship peaches, pears, and other similar fruit which requires great care in handling.

Another object of my invention is to have a series of package compartment-trays which may be inclosed in a box, crate, or package and thoroughly ventilated throughout, and also so constructed that each article of fruit can be held separate from another.

Another object of my invention is to construct these trays of strawboard or other suitable material which is adapted to be shipped knockdown and can be readily put together at the place of packing.

The features of my invention are more fully set forth in the description of the accompanying drawings, making a part of this specification, in which—

Figure 1 is a plan view of one of the tray-blanks cut and scored in condition for being formed into a tray. Fig. 2 is an end elevation of a set of four of these trays set up. Fig. 3 is an enlarged plan view of one of the tying-strips. Fig. 4 is an enlarged central vertical section through the center of the separate cells of one tray. Fig. 5 is a perspective view of one of the trays, showing the fruit in position. Fig. 6 is a plan view of the blank compressed, showing the position for inserting the tie-stringers.

In shipping peaches, pears, and other juicy fruit it is very desirable to have each peach or pear held from contact with another. It is also desirable to provide ventilation or air circulation around each article of fruit and through the packing-case. It is also desirable to support the fruit upon as little bearing-surface as possible. I accomplish these results by the following means:

A represents a blank provided with a series of scored lines $a$, a series of orifices $b$, and a series of slots $c$. These are formed, preferably, as shown, the scored lines parallel and equidistant apart, the orifices pierced along said lines, and the slots arranged transversely to said lines and located between the same and in parallel lines. The position of the orifices and of the slots can be varied, however, without departing from my invention, or the slots can be omitted to form a modification hereinafter explained.

$d$ $e$ represent the end tuck-flaps.

C represents the tying strips or stringers. These are adapted to be inserted through the slots $c$ when the blank is compressed, as shown in Fig. 6. They are provided with hooks or fingers $f$, adapted to rest against the outer ends of the tray when formed and hold the same in position. After the stringers are inserted the blank is opened out into tray form, the end tucks $d$ are folded inward, and the tucks $e$ folded upon them and preferably locked to them. This end locking is not essential, as the same result may be accomplished by other well-known equivalents. For instance, tying-strips could be used to form the ends in the same manner as they form the intermediate partitions and these tucks omitted. The box or crate in which the trays are inserted could also be used to form the end support, and the result would be substantially the same. The blank is folded along the scored lines alternately in opposite directions, thus forming a series of longitudinal V-shaped compartments upon each side of the tray. When the stringers are inserted and the tray opened out, a series of V-shaped cells will be formed upon each side of each tray. These trays are supported one upon the other in a suitable box, the V-shaped cells upon the lower side of the upper tray registering with the V-shaped cells on the upper side of the under tray to form a series of diamond-shaped cells. Of course that side of each tray in which the ends are turned up, as shown in Fig. 4, will have one more V-shaped longitudinal compartment than is formed on the under side.

It will readily be seen that in packing a tray is placed in position in the bottom of a suitable box and the fruit laid, each article by itself, in a cell. The tray thus filled is covered by another tray, the cell-sections on the under side of which form with the cell-sections of the tray packed a series of diamond-shaped cells admirably adapted to packing fruit. The stringers could be omitted, if desired, and the fruit laid in the longitudinal V-shaped compartments; but the form described is preferred, as it is possible with it to separately and securely pack each article of fruit out of contact with another article. Other means than stringers could be used as partitions to divide the longitudinal compartments into cells; but the form shown, in which the stringers are inserted through slots formed in the slanting walls of the compartments, gives the trays great strength and durability, which is a considerable item of importance in long-distance shipping.

It will be seen that when the trays are supported in the manner described, the ventilating-orifices being pierced along the scored lines will come, when the blank is bent into tray form, upon the edges of the tray, and hence register vertically from top to bottom, there being four orifices for each cell, one at the top and bottom and one at each side. The position of these orifices may be varied; but the form shown gives the best results.

The following advantages are derived from the use of a fruit-packing device in which the walls of the cells are inclined: The fruit nestles and finds a firm support vertically upon the smallest possible bearing-surface, the ventilating-orifices at the top, bottom, and sides of the cells are not covered, and the fruit having a support upon each side is not tossed about to such a degree in shipping as where a flat surface is used, and hence the bruising of the fruit is largely avoided.

There are many advantages derived from the use of my improved packing-tray, among which are the following:

First. The fruit can be packed much faster than where each article must be separately wrapped in tissue-paper, as is necessary in long-distance shipping by the methods hitherto employed.

Second. Each article of fruit is supported on a slightly elastic base, which prevents the bruising of the fruit from bouncing and jarring.

Third. The trays nest one upon another, and the box is more readily unpacked, and the fruit can be exposed for sale in its tray upon its arrival at the place of destination.

Fourth. The fruit when thus shipped in a ventilating-packing may be shipped when in a riper condition, as the free air circulation tends to prevent decay.

Fifth. It avoids the necessity of cold-storage cars and the consequent use of ice, which is a great saving in the expense of shipping fruit.

Sixth. These trays can be very cheaply constructed, shipped knockdown, and readily and quickly put together at the place of packing, and they can be made of various sizes and shapes to suit the requirements of the trade.

The box or package in which the trays are supported in packing is shown in dotted lines, Fig. 2, the blanks being shaped to fit the style of packing-box employed.

Having described my invention, I claim—

1. A blank for a collapsible packing-tray formed of thin material, scored in parallel longitudinal lines, one or more rows of ventilating-orifices pierced in said blank, one or more rows of horizontal slots pierced in said blank between the said scored lines, and a series of removable tie-rods each adapted to be inserted through a row of said horizontal slots when said blank is collapsed, substantially as described.

2. A blank for a collapsible packing-tray formed of thin material scored in parallel longitudinal lines, and adapted to be bent alternately in opposite directions upon said lines forming a series of longitudinal V-shaped compartments, one or more rows of ventilating-orifices pierced along the lines of folding, one or more parallel rows of horizontal slots pierced in said blank between said lines of folding, and one or more removable tie-rods each adapted to be strung through a row of said horizontal slots when said blank is collapsed, substantially as specified.

3. A packing device composed of a series of collapsible trays each bent to form a series of parallel longitudinal V-shaped compartments, a series of ventilating-orifices pierced in each tray along the lines of folding, a series of parallel transverse slots pierced in the inclined walls of said compartments between the top and bottom, and a series of removable tie-stringers, adapted to be strung through the transverse slots when the blank is collapsed, and to divide the longitudinal compartments into cells when the trays are folded out into shape, substantially as specified.

4. A collapsible packing-tray formed of a blank bent so as to form a series of V-shaped longitudinal compartments upon each side, a series of slots pierced transversely through the inclined walls of said compartments and between the spaces thereof, a series of removable tie-rods inserted through said transverse slots, notches provided in each end of said tie-rods adapted to engage the opposite ends of said tray, and ventilating-orifices pierced in each tray along the apices thereof, substantially as specified.

5. A collapsible packing-tray formed of a series of trays each bent to form a series of longitudinal V-shaped compartments, one or more rows of parallel transverse slots pierced in each tray along the inclined walls thereof between the apices of said compartments, a series of removable tie-rods each inserted through a row of said transverse slots and dividing the same into cells, notches provided at each end of said tie-rods to engage the opposite ends of said trays, and ventilating-orifices pierced in said trays along the lines of folding, and adapted to register when the trays are supported one upon the other in a packing-box, substantially as specified.

6. A blank for a collapsible packing-tray formed of thin material, a series of parallel scored lines formed on said blank, a series of ventilating-orifices formed along said lines, a series of parallel transverse slots pierced in said blank between said scored lines, and a series of removable tie-rods provided with notched ends each adapted to be simultaneously inserted through a row of said transverse slots when the blank is compressed in opposite directions along said scored lines, whereby when said tie-rods are inserted through said rows of slots, the blank can be freely expanded into shape when released, the notched ends of the stringers engaging the opposite ends of the blank, substantially as specified.

7. A packing device composed of two or more collapsible tray-sections, each formed of a blank bent alternately in opposite directions, removable partition-strips inserted through slots pierced in the walls of said compartment between the top and bottom thereof and transversely to the longitudinal compartments formed upon each side of the tray in bending, one or more ventilating-orifices pierced in the blank for each cell, the said trays being adapted when placed one upon the other to be supported upon the apices formed in folding, substantially as specified.

In testimony whereof I have hereunto set my hand.

FRANCIS C. STETTLER.

Witnesses:
OLIVER B. KAISER,
W. R. WOOD.